United States Patent
Kunchapu et al.

(10) Patent No.: US 12,526,353 B2
(45) Date of Patent: Jan. 13, 2026

(54) PHYSICAL LAYER AND METHODS FOR MANAGING PACKET HEADER FIELDS

(71) Applicant: SAMSUNG ELECTRONICS CO., LTD., Suwon-si (KR)

(72) Inventors: Nageswara Rao Kunchapu, Karnataka (IN); Krupal Jitendra Mehta, Karnataka (IN); Ashwini Kumari Barimar, Karnataka (IN); Praveen S Bharadwaj, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 415 days.

(21) Appl. No.: 18/212,518

(22) Filed: Jun. 21, 2023

(65) Prior Publication Data

US 2024/0364797 A1    Oct. 31, 2024

(30) Foreign Application Priority Data

Apr. 26, 2023  (IN) .............................. 202341030035

(51) Int. Cl.
*H04L 69/22*       (2022.01)
*G06F 13/00*       (2006.01)

(52) U.S. Cl.
CPC ................................. *H04L 69/22* (2013.01)

(58) Field of Classification Search
None
See application file for complete search history.

(56) References Cited

U.S. PATENT DOCUMENTS

| | | | |
|---|---|---|---|
| 6,154,460 A | * | 11/2000 | Kerns ................ H04L 49/9042 370/398 |
| 7,130,312 B1 | | 10/2006 | Amagai et al. |
| 7,290,134 B2 | | 10/2007 | Buer et al. |
| 7,296,100 B1 | * | 11/2007 | Venkatesh ............ G06F 13/128 710/33 |
| 7,738,471 B2 | | 6/2010 | Kuliner |
| 7,860,125 B2 | | 12/2010 | Bains et al. |
| 8,619,800 B1 | | 12/2013 | Finney et al. |
| 9,338,100 B2 | | 5/2016 | Wong et al. |
| 9,432,298 B1 | | 8/2016 | Smith |
| 9,916,269 B1 | * | 3/2018 | Machulsky ......... G06F 13/4068 |
| 10,764,176 B1 | | 9/2020 | Attig et al. |
| 11,528,095 B2 | | 12/2022 | Arulappan et al. |
| 2009/0154498 A1 | * | 6/2009 | Hong .................. H04L 12/2801 370/474 |

(Continued)

OTHER PUBLICATIONS

EESR issued in Corresponding EP Patent Application No. 23187198.9 on Sep. 16, 2024.

*Primary Examiner* — Duc T Duong
(74) *Attorney, Agent, or Firm* — Morgan, Lewis & Bockius LLP (57) ABSTRACT

A method for managing packet header fields in a physical (PHY) layer includes: receiving, by a header descriptor array (HDA) of a PHY layer, a data packet and a status signal of the data packet; writing, by the HDA, a header field for the received data packet; storing, by the HDA, the written header field and the status signal of the data packet in a header field array; and fetching, by the HDA, the header field of the data packet by enabling parallel reading of a plurality of locations of the header field array, enabling transmission and re-transmission of the data packet.

20 Claims, 7 Drawing Sheets

(56) References Cited

U.S. PATENT DOCUMENTS

| | | |
|---|---|---|
| 2013/0347103 A1 | 12/2013 | Veteikis et al. |
| 2018/0267746 A1* | 9/2018 | Itoh .................... G06F 3/061 |
| 2019/0179697 A1* | 6/2019 | Horio ................ G06F 11/1004 |
| 2019/0306287 A1 | 10/2019 | Kniplitsch et al. |
| 2019/0379770 A1* | 12/2019 | Thantry ................ H04L 69/22 |

\* cited by examiner

PHYSICAL LAYER AND METHODS FOR MANAGING PACKET HEADER FIELDS

CROSS-REFERENCE TO RELATED APPLICATION

This application claims priority under 35 U.S.C. § 119 to Indian patent application No. 202341030035, filed on Apr. 26, 2023 in the Indian Intellectual Property Office, the disclosure of which is incorporated by reference in its entirety herein.

TECHNICAL FIELD

Embodiments of the inventive concept disclosed herein relate to data communications and more particularly to a physical (PHY) layer and methods for managing packet header fields in multi-layer packet network communications in order to facilitate low latency.

DISCUSSION OF RELATED ART

In general, packet data networks are constructed based on multi-layer communication models, which consist of a physical (PHY) layer for encoding and decoding data into signals and transmitting them over a physical medium. The PHY layer is capable of transferring high-speed data between electronic components, such as between sensors, cameras, display units, and their corresponding electronic control units (ECUs). Additionally, the multi-layer communication model includes a data link layer that ensures reliable transmission of data over a network, while also interfacing with the PHY layer and a network layer.

After encoding and decoding received data, the data packets may contain errors, and a packet error rate (PER) defines the likelihood of errors occurring in the decoded data. For example, in the automotive industry, short burst noises can arise due to factors that could disrupt the transmission of data packets between the electronic components. Therefore, to minimize errors and attain a low PER, packet data networks utilize one or more error detection and/or error correction capabilities within both the PHY layer and the data link layer.

Traditionally, the data packets are processed in the data link layer by the utilization of queues, FIFOs, and other similar mechanisms. Each data packet can be individually examined and then processed using a re-transmission mechanism. For example, if a data packet becomes corrupted due to short burst noises, a queuing method may be employed to request the re-transmission of the data packet. However, this serial way of implementation may take a considerable amount of time to execute multiple error corrective actions.

SUMMARY

Embodiments of the inventive concept provide a physical (PHY) layer with methods for managing one or more packet header fields in multi-layer packet network communications.

Another embodiment of the inventive concept provides a PHY layer that includes a centralized module designed to support an ultra-low Packet Error Rate (PER) while preserving low latency.

Another embodiment of the inventive concept provides a PHY layer that is capable of analyzing one or more header fields of one or more data packets to verify whether the correct data packets have been received.

Another embodiment of the inventive concept provides a PHY layer that stores header fields in an array, facilitating the forwarding of each data packet in its original order to a data link layer. Moreover, this embodiment enables the processing of re-transmission requests to a next layer.

Another embodiment of the inventive concept provides a PHY layer that enables the parallel reading of multiple header fields, thereby allowing for the transmission and re-transmission of one or more data packets with lower latency.

Another embodiment of the inventive concept provides a method for managing packet header fields in a PHY layer, comprising: receiving, by a header descriptor array (HDA) of a PHY layer, a data packet and a status signal of the data packet; writing, by the HDA, a header field for the received data packet; storing, by the HDA, the written header field and the status signal of the data packet in a header field array; and fetching, by the HDA, the header field of the data packet by enabling parallel reading of a plurality of locations of the header field array, enabling transmission and re-transmission of the data packet.

Another embodiment of the inventive concept provides a PHY layer comprising: an HDA configured to: receive a data packet and a status signal of the data packet; write a header field for the received data packet; store the written header field and the status signal of the data packet in a header field array, and fetch the header field of the data packet by enabling parallel reading of a plurality of locations of the header field array, enabling transmission and re-transmission of the data packet.

Another embodiment of the inventive concept provides a system for managing packet header fields in a PHY layer, comprising: an HDA configured to receive a data packet and a status signal of the data packet, store a header field of the data packet and track a status of a plurality of data packets, wherein the HDA comprises: a write interface module configured to write the header field and store the written header field, a plurality of internally generated fields, and the status signal of the data packet in a header field array, wherein the write interface module comprises a storage element array and a combinational logic for writing and updating a plurality of header fields using a plurality of internal blocks of the PHY layer, and for tracking the status signal for verifying whether the received data packet is good or bad before writing the header field; and a plurality of read interface modules, wherein each read interface module comprises a multiplexer (MUX), an AND gate and a programmable delay element for fetching the plurality of header fields and the plurality of internally generated fields of the plurality of data packets by enabling parallel reading of a plurality of locations of the header field array using the plurality of internal blocks of the PHY layer to access the status of the plurality of data packets.

BRIEF DESCRIPTION OF THE DRAWINGS

Embodiments of the inventive concept disclosed herein are illustrated in the accompanying drawings in which like reference letters or numerals indicate corresponding parts. The embodiments disclosed herein will be better understood from the following description with reference to the drawings, in which.

DETAILED DESCRIPTION OF THE EMBODIMENTS

The embodiments of the inventive concept disclosed herein and the various features thereof are explained more fully with reference to the accompanying drawings in the following detailed description. Descriptions of well-known components and processing techniques are omitted. The embodiments described herein are intended to facilitate an understanding of ways in which the inventive concept may be practiced. Accordingly, the disclosed embodiments should not be construed as limiting the scope of the inventive concept.

The embodiments disclosed herein provide a physical (PHY) layer that stores and accesses header fields of one or more data packets, thus supporting an ultra-low Packet Error Rate (PER) while maintaining low latency.

Figure 1:
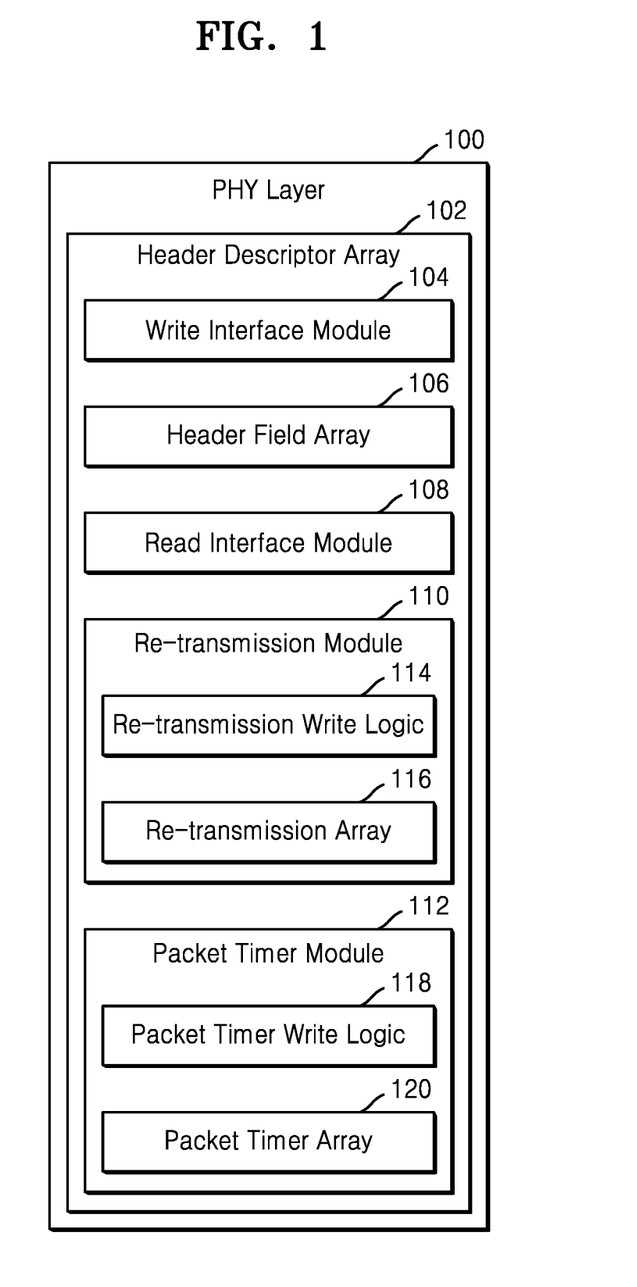
FIG. 1 depicts a physical (PHY) layer for managing packet header fields, according to embodiments as disclosed herein.

FIG. 1 depicts a PHY layer 100 for managing packet header fields. The PHY layer 100 can comprise a header descriptor array (HDA) 102. The HDA 102 is a centralized module for storing and accessing one or more data packets header fields. In other words, the HDA 102 stores and accesses header fields of one or more data packets. The HDA 102 can receive at least one data packet and at least one status signal of the data packet. The HDA 102 can store at least one header field, a plurality of internally generated fields, and the status signal of the data packets. The HDA 102 can store complete header fields of any data packet, wherein each data packet can be forwarded in a regular order to a data link layer, while also enabling the processing of re-transmission requests to the data link layer. The HDA 102 can further track the status of the plurality of data packets by analyzing a plurality of stored header fields and verifying the status signals. The HDA 102 can also check whether the data packet is received correctly.

The HDA 102 comprises a write interface module 104, a header field array 106, a plurality of read interface modules 108, a re-transmission module 110, and a packet timer module 112.

In an embodiment, the write interface module 104 is configured to receive at least one data packet and at least one status signal of the data packet, and write at least one header field for the received data packet. The status signal of the data packet can be generated by at least one internal block of the PHY layer 100.

Figure 2:
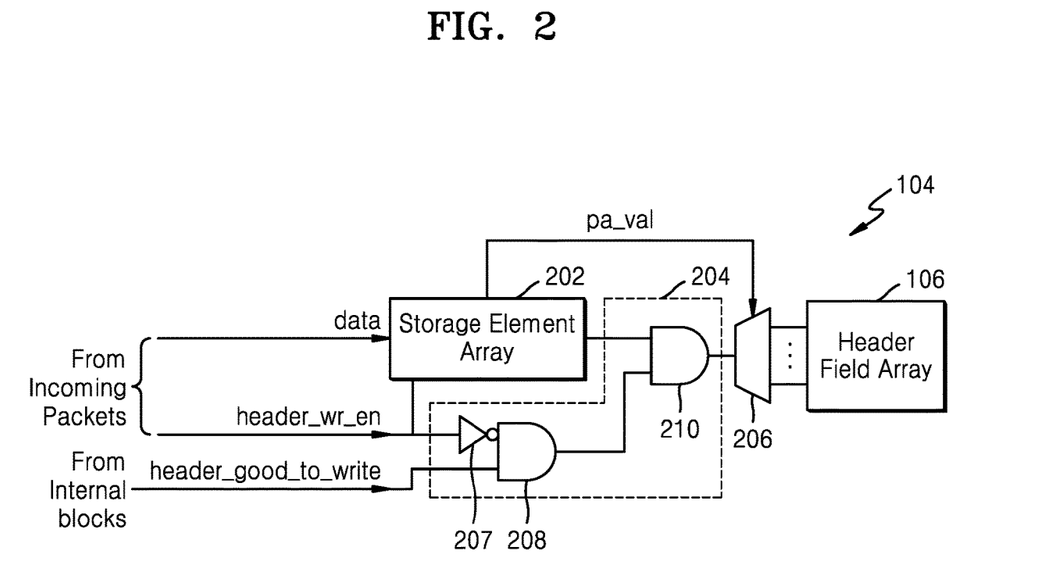
FIG. 2 depicts a write interface module of a header descriptor array (HDA), according to embodiments as disclosed herein.

FIG. 2 depicts a write interface module 104 of the HDA 102. The write interface module 104 comprises a storage element array 202, a combinational logic circuit 204, and a de-multiplexer (DEMUX) 206.

In an embodiment, the storage element array 202 can receive a plurality of data packets (e.g., data) from incoming data packets, which may be received from an electronic computing device. The storage element array 202 serves as a storage capacity for temporarily storing header fields or internally generated fields corresponding to the data packets that are to be written to the header field array 106, status signals and a plurality of internally generated fields. The internally generated fields stored by the write interface module 104 can comprise, but are not limited to, marking if the received data packet is good/bad, marking missed data packets, a length of the data packet, a number of retries for a given data packet, tracking if the received data packet delivered to a next layer, etc. The storage element array 202 can be a memory that is associated with the header field array 106, or a separate component such as a disk drive, a USB memory device, an expandable memory device, or a combination thereof. The data packets can be received from the data link layer. In an embodiment, the storage element array 202 can be a temporary array.

In an embodiment, the combinational logic circuit 204 comprises a NOT gate 207 and two AND gates 208 and 210. The NOT gate 207 and a first AND gate 208 receive a header write enable (header_wr_en) signal from the incoming data packets, and at least one status signal (header_good_to_write) from a plurality of internal blocks indicating whether the received data packet is good or bad. The internal blocks of the PHY layer 100 decide on which data packet has to be transmitted to one or more other layers, analyze feedback coming from the other layer, and take necessary actions such as transmitting headers of the data packets whenever transmitter side components and receiver side components need information from the headers. The decision of the data packet is made by verifying at a header cyclic redundancy check (CRC). If the header CRC is good, the header fields can be transferred from the storage element array 202 to the main header field array 106. However, if the header CRC is bad/corrupted, the packet can be dropped.

The first AND gate 208 provides an output logic indicating a header write enable signal of whether the header fields can be moved from the storage element array 202 to the header field array 106. This can be decided by verifying the header CRC. If the header CRC is good, then the header fields can be moved from the storage element array 202 to the header field array 106. If the header CRC is bad/corrupted, then the packet can be dropped. The storage electrode array 202 receives the header write enable signal, which allows it to determine the location of the data packet to be transmitted based on an index of the stored data packet. If the header is determined to be good, the header field can then be moved from the storage element array 202 to the header field array 106. The received header field comprises a "packet number" field. A packet address value (pa_val) is sent from the storage element array 202 to the DEMUX 206. This packet number is used as an array location. The array location of the header is determined based on the packet number field in the received header. Further, a second AND gate 210 receives the output logic from the first AND gate 208 and the index of the data packet from the storage element array 202, and outputs a signal to the DEMUX 206.

In an embodiment, the DEMUX 206 is configured to write at least one header field and at least one status signal of the data packet in the header field array 106, based on the signal obtained from the second AND gate 210.

In an embodiment, the write interface module 104 is configured to write and update a plurality of header fields by a plurality of internal blocks of the PHY layer 100. Further, when multiple internal blocks attempt to update the same header field at the same time, the header field is updated based on priority.

In an embodiment, the write interface module 104 can track the received status signal to verify the quality of the received data packet (e.g., good or bad) before writing at least one header field. The write interface module 104 can also use the status signal to check for the receipt of any re-transmission requests for the data packet, as well as if the data packet is missing. The received data packet is verified using a CRC check.

Figure 3:
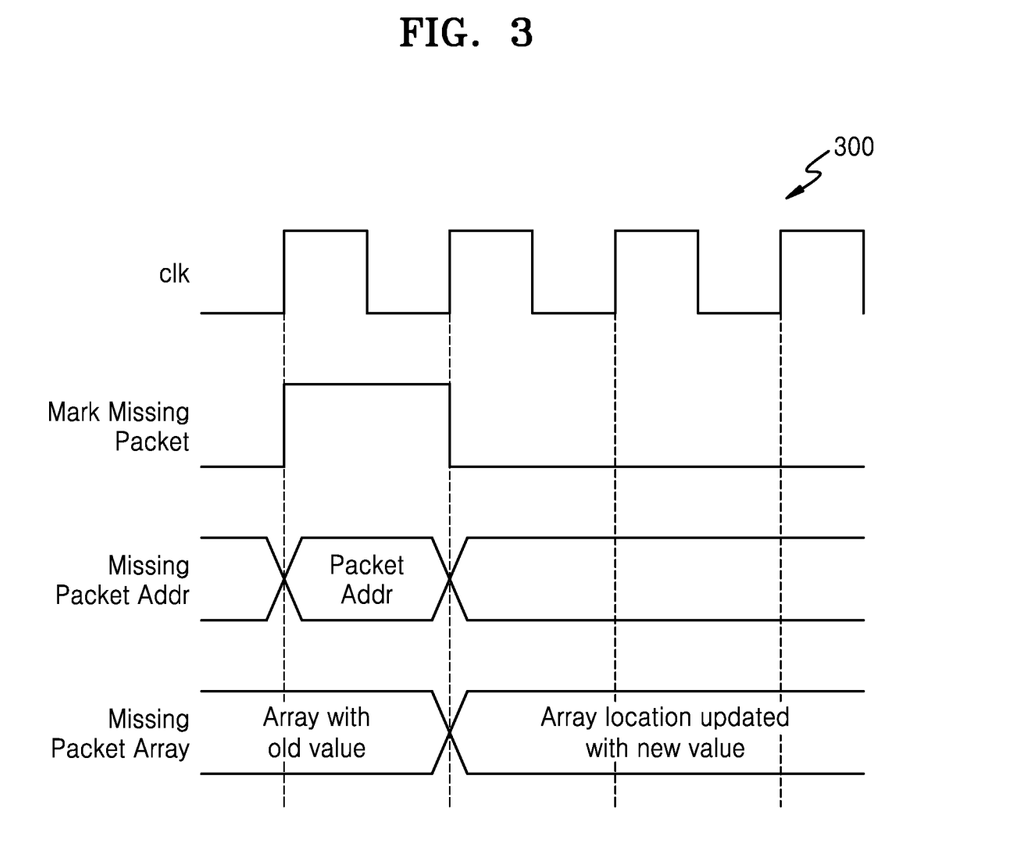
FIG. 3 depicts a timing diagram of the write interface module, according to embodiments as disclosed herein.

FIG. 3 depicts a timing diagram 300 of the write interface module 104. The timing signals indicate marking missing data packet, missing data packet address, and missing data packet array of the write interface module 104. The internal block which is requesting a write into the header field array 106 generates a pulse signal (e.g., mark missing packet with high level) along with the address (e.g., Packet Addr) for a missing packet. As seen in the timing diagram 300, the HDA 102 serves this request by updating the array location with a new value.

In an embodiment, the header field array 106 is configured to store one or more written header fields, a plurality of internally generated fields, and the status signals of the data packets. Whenever a data packet is received with the good header CRC, the header fields of the data packet can be stored in the header field array 106. The header field array 106 additionally stores other status signals generated internally to determine if the received data packet is good/bad, if a re-transmission request is generated, how many re-transmission requests are generated for a given data packet, if any data packets are missing, etc.

In an embodiment, the header field array 106 can be configured with "N" elements for storing header fields and status of "N" data packets. The header fields are written and stored in the header field array 106 based on the index of the data packets. The header field array 106 can organize multiple header fields to make information simultaneously available for a plurality of internal blocks. For example, the internal blocks require information from the data packets to determine which packet should be transmitted to the next layer if multiple data packets exist, and to determine which request should be served if there are multiple requests.

In an embodiment, the read interface module 108 can fetch header or internally generated fields from at least one data packet by enabling parallel reading of a multiple locations in the header field array 106, which in turn allows for the transmission and re-transmission of the data packet with an ultra-low packet error rate (PER).

Figure 4:
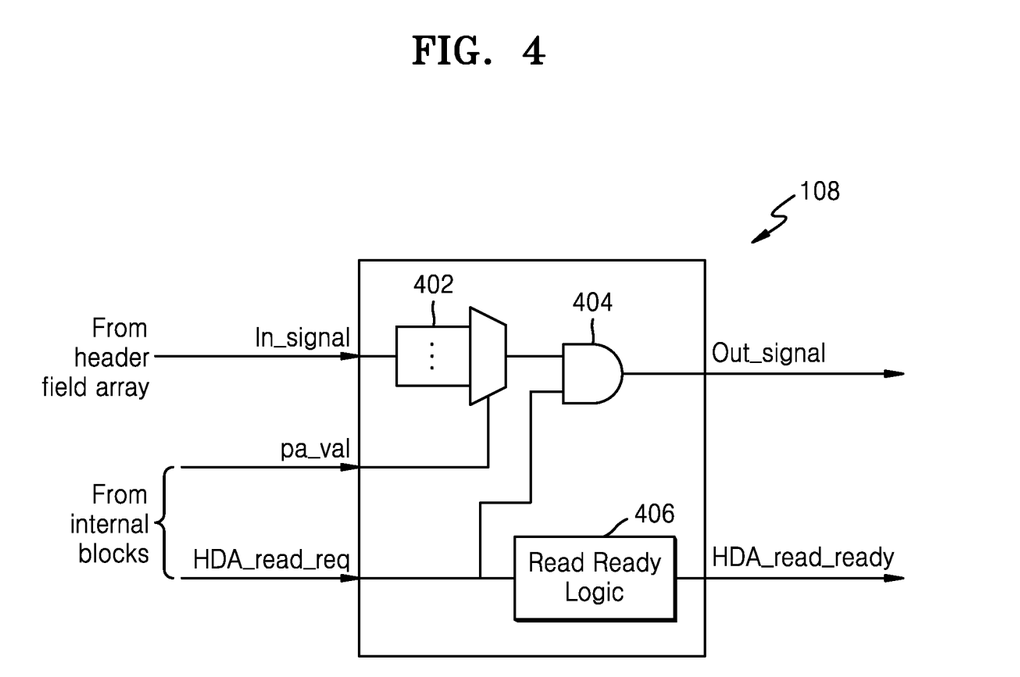
FIG. 4 depicts a read interface module of the HDA, according to embodiments as disclosed herein.

FIG. 4 depicts a read interface module 108 of the HDA 102. The read interface module 108 comprises a multiplexer (MUX) 402, an AND gate 404 and a read ready logic 406. In an embodiment, the read ready logic 406 can receive a read request (HDA_read_req) from at least one internal block of the PHY layer 100 that needs to access the status of at least one data packet. The internal blocks of the PHY layer 100 can also send a packet address value (pa_val) along with the read request (HDA_read_req), wherein the packet address value (pa_val) is transmitted to the MUX 402. The read interface module 108 is further connected with the header field array 106, and in this configuration, the MUX 402 can obtain the input data (In_signal) from the header field array 106. The MUX 402 processes the inputs of the packet address value (pa_val) with the input data (In_signal) provided from the header field array 106. The MUX 402 uses the packet address value (pa_val) as a select line. The MUX 402 selects the data from a required index of array using the packet address value (pa_val) and sends the selected data to its output signal (Out_signal). The MUX 402 transmits output signal (Out_signal) to the AND gate 404. The AND gate 404 validates the incoming read request and passes the selected header field value to the internal block.

In an embodiment, the read ready logic 406 comprises a programmable delay element, which can manipulate the rising and falling edges of the signal (so as to delay the signal) and then generate a read ready signal (HDA_read_ready) for internal blocks. The programmable delay on the read ready signal (HDA_read_ready) can be used to adjust latency for a block requesting the read. The read interface module 108 can be instantiated multiple times based on how many blocks need access to the HDA 102 for reading.

In an embodiment, a number of read interface modules 108 can be configured in the HDA 102, based on the number of the internal blocks of the PHY layer 100 that need information from the HDA 102. The HDA 102 can comprise a plurality of parallel read interface modules 108 for reading multiple locations of the header field array 106 by multiple internal blocks, at same time. This greatly reduces latency in processing the data packets.

Figure 5:
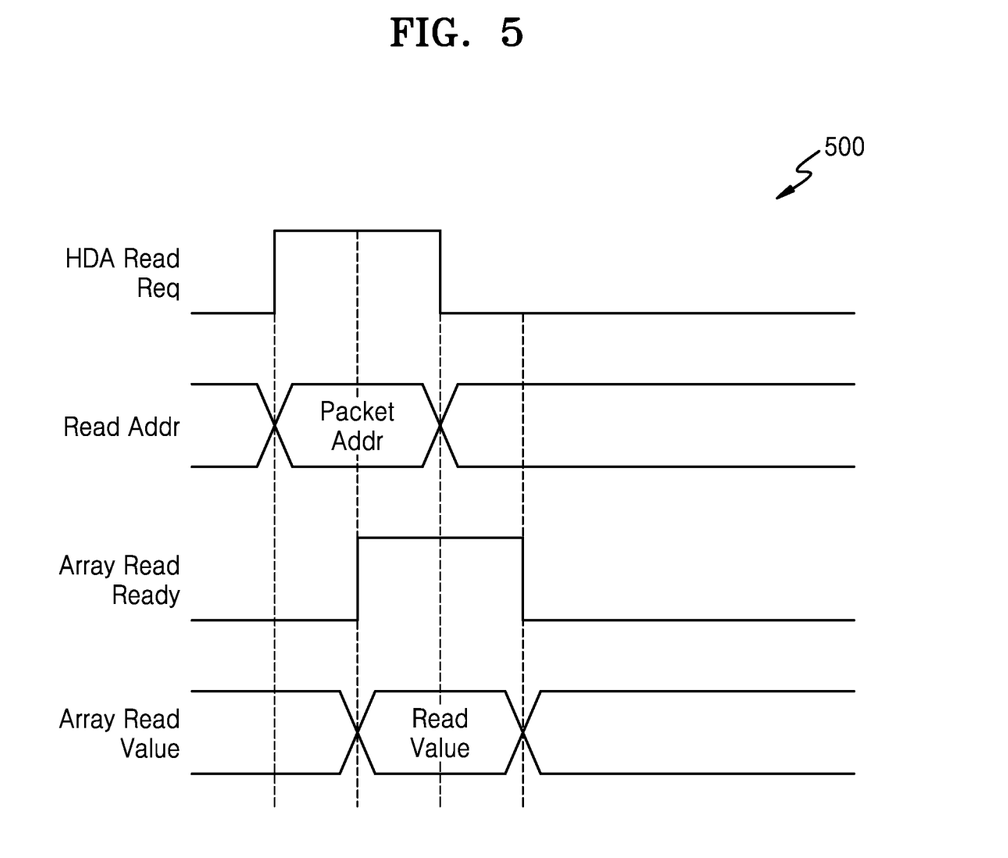
FIG. 5 depicts a timing diagram of the read interface module, according to embodiments as disclosed herein.

FIG. 5 depicts a timing diagram 500 of the read interface module 108. The timing signals indicate HDA read request, read packet address, array read ready, and array read value of the read interface module 108. The internal blocks requesting a read generate a HDA read request pulse (see high pulse of HDA read request) along with the packet address value (e.g., index of an array). The read interface module 108 generates a value read from the HDA 102 and a read ready signal (see high pulse of array read ready) to indicate a read value.

In an embodiment, the re-transmission module 110 of the PHY layer 100 is configured to receive at least one re-transmission request from at least one internal block of the PHY layer 100, when an error is identified while transmitting at least one data packet from the PHY layer 100. When the error is detected using at least one error detection or correction method, the PHY layer 100 may initiate an error corrective action. In an embodiment, the error corrective action may comprise transmitting the re-transmission request from the internal block to the HDA 102 for enabling re-transmission of the data packet to the next layer.

The re-transmission module 110 comprises a re-transmission write logic 114 and a re-transmission array 116. One example of a method for tracking the number of re-transmission attempts is through the use of the re-transmission array 116. The re-transmission write logic 114 can receive a re-transmission write request to update a number of request retries sent and a packet address for re-transmission of a data packet, from the internal block. The re-transmission write logic 114 can process the request and transmit an output signal to the re-transmission array 116. The re-transmission array 116 can re-transmit the data packet from the PHY layer 100, based on the output signal received from the re-transmission write logic 114. The re-transmission array 116 can store the number of re-transmissions of the data packets.

In an embodiment, the packet timer module 112 comprises packet timer write logic 118 and a packet timer array 120. An example of a storage mechanism for the time at which the data packets are received inside the PHY layer 100 is the packet timer array 120, which stores the time of the internally generated fields of the received data packets. The packet timer write logic 118 can receive a packet timer write request to write the time the data packet was received from the internal block. The packet timer array 120 follows the same process performed by the re-transmission array 116, such that when a data packet is received in the PHY layer 100, a request is generated from an internal block to write a packet timer array value inside the packet timer array 120 of the HDA 102.

FIG. 1 shows example modules of the PHY layer 100, but it is to be understood that other embodiments are not limited thereon. In other embodiments, the PHY layer 100 may include less or more modules. Further, the labels or names of the modules are used for illustrative purpose and do not limit the scope of the inventive concept. One or more modules can be combined together to perform the same or substantially similar function in the PHY layer 100.

Figure 6:
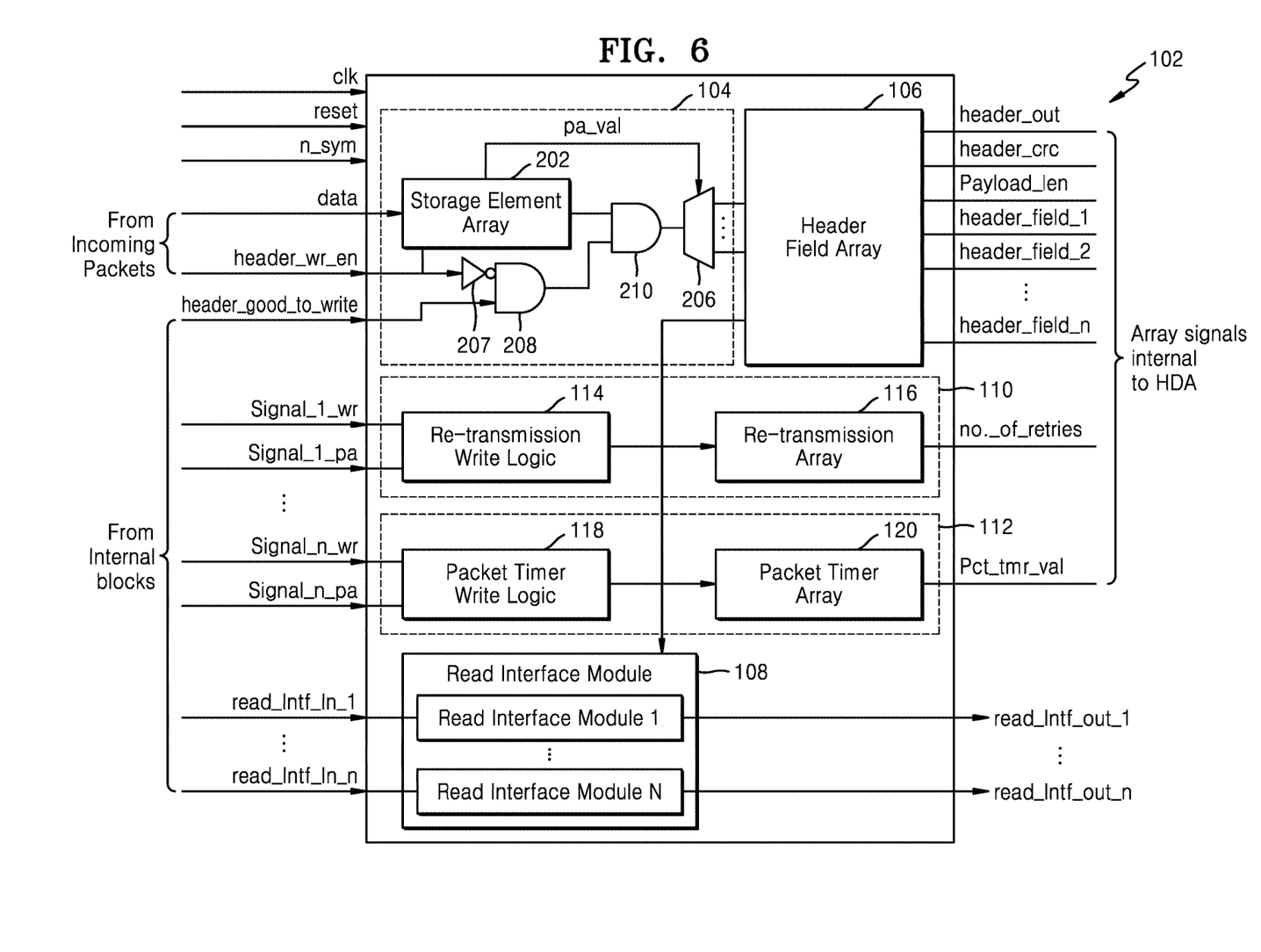
FIG. 6 depicts a detailed block diagram of the HDA of the PHY layer, according to embodiments as disclosed herein.

FIG. 6 depicts a detailed block diagram of the HDA 102 of the PHY layer 100. The HDA 102 receives a plurality of signals such as clk, reset, number of symbols of data packets (n_sym), signals from incoming packets, signals from the internal blocks, etc. The HDA 102 comprises the write interface module 104 for receiving a plurality of data packets and writing a plurality of header fields of the data packets. The write interface module 104 can receive data packets and a header write enable (header_wr_en) signal from the incoming packets, and a header_good_to_write signal from the internal blocks. The written header fields, internally generated fields and status signals are then transmitted and stored in the header field array 106.

The header field array 106 can output signals such as header_out, header_crc, payload_len, header_field_1, header_field_2, . . . header field n. The HDA 102 can comprise a plurality of read interface modules 108 such as read interface module 1, read interface module 2, . . . read interface module N. The read interface modules 108 are connected with the header field array 106 for enabling parallel reading of the plurality of locations of the header field array 106 of the data packets for accessing the status of the data packets. The read interface modules 108 can receive read request signals such as read_Intf_In_1, read_Intf_In_2, . . . read_Intf_In_n from the internal blocks, and provide read output signals such as read_Intf_out_1, read_Intf_out_2, . . . read_Intf_out_n.

The re-transmission module 110 can receive at least one re-transmission request from at least one internal block for enabling re-transmission of the data packet to the next layer. The re-transmission module 110 can receive write signals such as Signal_1_wr, . . . Signal_n_wr and packet address signals such as Signal_1_pa, . . . Signal_n_pa, and output the number data packet transmission retries (no._of_retries). The packet timer module 112 can receive write signals such as Signal_1_wr, . . . Signal_n_wr and packet address signals such as Signal_1_pa, . . . Signal_n_pa, and output a timer value signal for a data packet such as pct_tmr_val.

Figure 7:
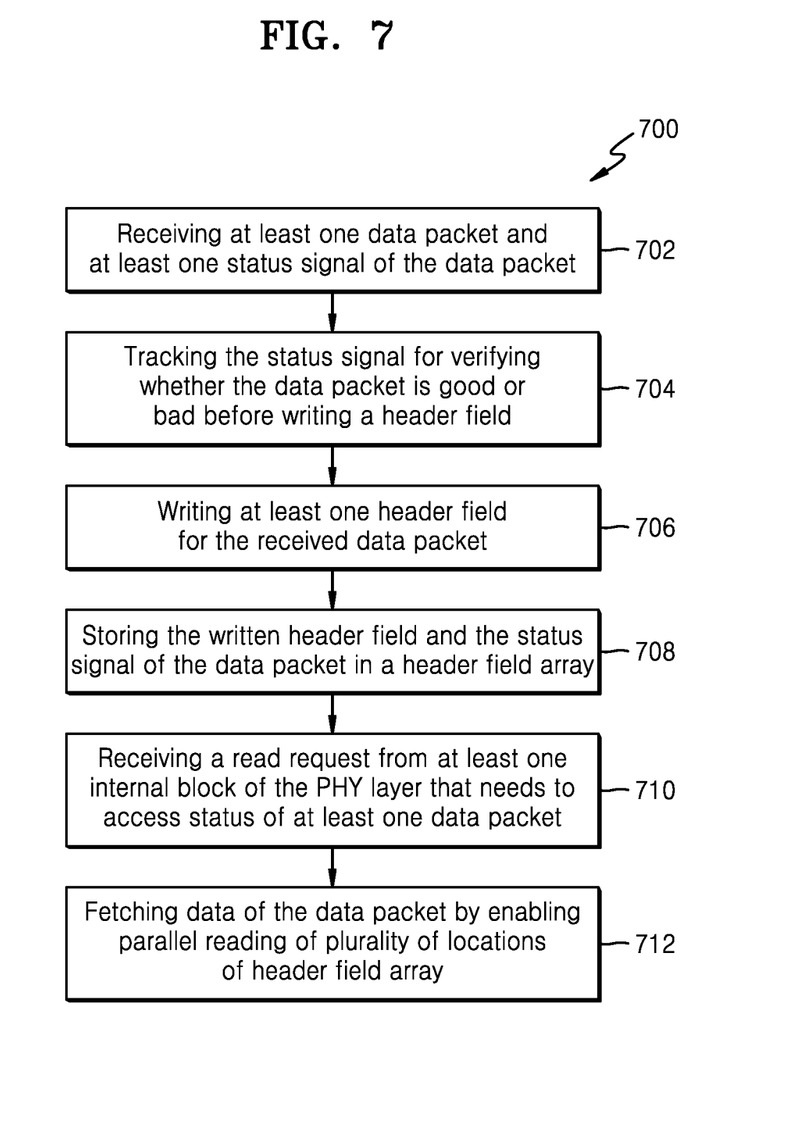
FIG. 7 depicts a method for managing packet header fields in a PHY layer, according to embodiments as disclosed herein.

FIG. 7 depicts a method 700 for managing packet header fields in a PHY layer 100. The method 700 discloses receiving, by the write interface module 104, at least one data packet and at least one status signal of the data packet, as depicted in step 702, from incoming packets. Subsequently, the method 700 discloses tracking the status signal, by the write interface module 104, for verifying whether the data packet is good or bad before writing a header field of the data packet, as depicted in step 704.

Thereafter, the method 700 discloses writing, by the write interface module 104, at least one header field for the received data packet based on the tracked status signal, as depicted in step 706. Next, the method 700 discloses storing, by the write interface module 104, the written header field and the status signal of the data packet in a header field array 106, as depicted in step 708. Thereafter, the method 700 discloses receiving, by at least one read interface module 108, a read request from at least one internal block of the PHY layer 100 that needs to access the status of at least one data packet, as depicted in step 710. Next, the method 700 discloses fetching, by the read interface module 108, header or internally generated fields of at least one data packet by enabling parallel reading of a plurality of locations of the header field array 106, as depicted in step 712, for allowing transmission and re-transmission of the data packets with an ultra-low packet error rate (PER).

The various actions in method 700 may be performed in the order presented, in a different order or simultaneously. Further, in some embodiments, some actions listed in FIG. 7 may be omitted.

Thus, the PHY layer 100 supports low latency by using parallel reading of the stored header fields. Since, in automotive industry, there are multiple burst noises, the PHY layer 100 processes the transmission and re-transmission of the data packet by achieving ultra-low PER.

The embodiments disclosed herein can be implemented through at least one software program running on at least one hardware device. The modules shown in FIG. 1 can be at least one of a hardware device such as an electronic circuit, or a combination of hardware device and software module.

While the present inventive concept has been described with reference to embodiments thereof, it will be apparent to those of ordinary skill in the art that various changes and modifications may be made thereto without departing from the spirit and scope of the inventive concept as set forth in the following claims.

What is claimed is:

1. A method for managing packet header fields in a physical (PHY) layer, comprising:
   receiving, by a header descriptor array (HDA) of a PHY layer, a data packet and a status signal of the data packet;
   writing, by the HDA, a header field for the received data packet;
   storing, by the HDA, the written header field and the status signal of the data packet in a header field array; and
   fetching, by the HDA, the header field of the data packet by enabling parallel reading of a plurality of locations of the header field array, enabling transmission and re-transmission of the data packet.

2. The method as claimed in claim 1, wherein the writing of the header field is performed using a write interface module of the HDA.

3. The method as claimed in claim 2, wherein the write interface module comprises a storage element array and a combinational logic for writing and updating a plurality of header fields by a plurality of internal blocks of the PHY layer, wherein updating a same header field by the plurality of internal blocks at the same time includes updating the same header field based on priority.

4. The method as claimed in claim 2, wherein the write interface module is configured to track the received status signal to verify if the received data packet is good or bad during one of: 1) before writing the header field, 2) at least one re-transmission request is received for the data packet, and 3) the data packet is missing.

5. The method as claimed in claim 1, wherein the HDA comprises a plurality of read interface modules, wherein each read interface module comprises a multiplexer (MUX), an AND gate and a programmable delay element for enabling the parallel reading of the header field array.

6. The method as claimed in claim 1, wherein the status signal of the data packet is generated by an internal block of the PHY layer.

7. The method as claimed in claim 1, wherein the transmission and re-transmission of the data packet is done with an ultra-low packet error rate (PER).

8. A physical (PHY) layer comprising:
a header descriptor array (HDA) configured to:
receive a data packet and a status signal of the data packet;
write a header field for the received data packet;
store the written header field and the status signal of the data packet in a header field array; and
fetch the header field of the data packet by enabling parallel reading of a plurality of locations of the header field array, enabling transmission and re-transmission of the data packet.

9. The PHY layer as claimed in claim 8, wherein the HDA comprises a write interface module for writing the header field.

10. The PHY layer as claimed in claim 9, wherein the write interface module comprises a storage element array and a combinational logic for writing and updating a plurality of header fields by a plurality of internal blocks of the PHY layer, wherein updating a same header field by the plurality of internal blocks at the same time includes updating the same header field based on a priority.

11. The PHY layer as claimed in claim 9, wherein the write interface module is configured to track the received status signal to verify if the received data packet is good or bad during one of: 1) before writing the header field, 2) at least one re-transmission request is received for the data packet, and 3) the data packet is missing.

12. The PHY layer as claimed in claim 8, wherein the HDA comprises a plurality of read interface modules, wherein each read interface module comprises a multiplexer (MUX), an AND gate and a programmable delay element for enabling the parallel reading of the header field array.

13. The PHY layer as claimed in claim 8, wherein the status signal of the data packet is generated by an internal block of the PHY layer.

14. The PHY layer as claimed in claim 8, wherein the transmission and re-transmission of the data packet is done with an ultra-low packet error rate (PER).

15. A system for managing packet header fields in a physical (PHY) layer, comprising:
a header descriptor array (HDA) configured to receive a data packet and a status signal of the data packet, store a header field of the data packet and track a status of a plurality of data packets, wherein the HDA comprises:
a write interface module configured to write the header field and store the written header field, a plurality of internally generated fields, and the status signal of the data packet in a header field array, wherein the write interface module comprises a storage element array and a combinational logic for writing and updating a plurality of header fields using a plurality of internal blocks of the PHY layer, and for tracking the status signal for verifying whether the received data packet is good or bad before writing the header field; and
a plurality of read interface modules, wherein each read interface module comprises a multiplexer (MUX), an AND gate and a programmable delay element for fetching the plurality of header fields and the plurality of internally generated fields of the plurality of data packets by enabling parallel reading of a plurality of locations of the header field array using the plurality of internal blocks of the PHY layer to access the status of the plurality of data packets.

16. The system as claimed in claim 15, wherein the plurality of internally generated fields stored by the write interface module comprise at least one of marking if the received data packet is good/bad, marking missed data packets, a length of the data packet, number of retries for a given data packet, and tracking if the received data packet delivered to a next layer.

17. The system as claimed in claim 15, wherein the write module further comprises a de-multiplexer configured to receive an output of the storage element array and an output of the combinational logic.

18. The system as claimed in claim 17, wherein the output of the storage element array includes a packet address value.

19. The system as claimed in claim 17, wherein the output of the combinational logic is based on an index of the data packet provided from the storage element array.

20. The system as claimed in claim 15, wherein the system supports an ultra-low Packet Error Rate (PER).

* * * * *